United States Patent [19]

Nedzu et al.

[11] Patent Number: 5,100,717
[45] Date of Patent: * Mar. 31, 1992

[54] SURFACE-PATTERNED POLYBUTYLENE TEREPHTHALATE RESIN MOLDED ARTICLES AND PROCESS FOR PREPARING SUCH MOLDED ARTICLES

[75] Inventors: Shigeru Nedzu, Shizuoka; Yoichi Ebina, Osaka; Terutaka Sano, Shizuoka, all of Japan

[73] Assignee: Polyplastics Co., Ltd., Osaka, Japan

[*] Notice: The portion of the term of this patent subsequent to Aug. 6, 2008 has been disclaimed.

[21] Appl. No.: 557,719

[22] Filed: Jul. 26, 1990

[30] Foreign Application Priority Data

Jul. 26, 1989 [JP] Japan ................................. 1-193760

[51] Int. Cl.$^5$ ............................................. B32B 9/00
[52] U.S. Cl. ................................. 428/195; 428/204; 428/206; 428/411.1; 264/129; 8/456; 8/471; 524/98; 524/281; 524/539
[58] Field of Search ................ 264/129; 8/456, 471; 524/98, 281, 539; 428/195, 204, 206, 411.1

[56] References Cited

U.S. PATENT DOCUMENTS

| | | | |
|---|---|---|---|
| 4,080,360 | 3/1978 | Schlichting et al. | 524/98 |
| 4,131,595 | 12/1978 | Breitenfellner et al. | 524/539 |
| 4,369,280 | 1/1983 | Dieck et al. | 524/281 |
| 4,764,177 | 8/1988 | Sims et al. | 8/471 |
| 4,820,310 | 4/1989 | Fukui | 8/456 |
| 4,844,851 | 7/1989 | Hotta et al. | 264/129 |

FOREIGN PATENT DOCUMENTS

| | | |
|---|---|---|
| 0311079 | 4/1989 | European Pat. Off. . |
| 3738212A1 | 5/1989 | Fed. Rep. of Germany . |
| 1234237 | 10/1960 | France . |
| 1255820 | 1/1961 | France . |
| 1372909 | 8/1964 | France . |

Primary Examiner—Patrick J. Ryan
Attorney, Agent, or Firm—Nixon & Vanderhye

[57] ABSTRACT

A surface-patterned, injection-molded article of polybutylene terephthalate is produced by placing a film composed mainly of a polybutylene resin and back-printed with a desired graphic and/or indicia pattern in a mold cavity so that the printed surface of the film will be in contact with resin to be injected thereinto. Prior to mold placement, the back-printed surface is coated with an adhesive layer. Molten resin composed mainly of polybutylene terephthalate is then injected into the mold cavity to cause the adhesive to bond the pattern-printed film integrally onto a corresponding surface of the resulting molded PBT article.

14 Claims, 2 Drawing Sheets

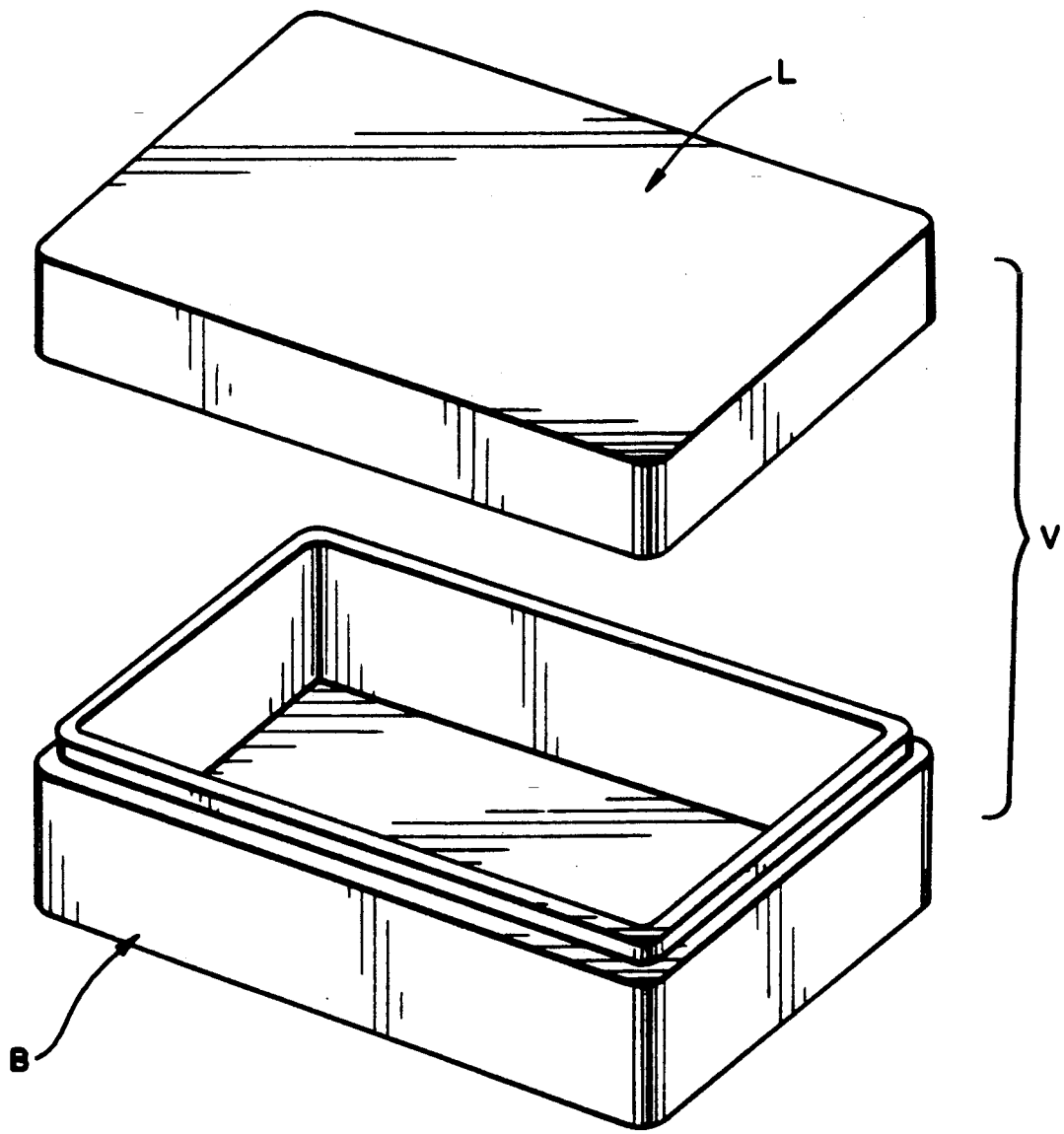

SURFACE-PATTERNED POLYBUTYLENE TEREPHTHALATE RESIN MOLDED ARTICLES AND PROCESS FOR PREPARING SUCH MOLDED ARTICLES

CROSS-REFERENCE TO RELATED APPLICATIONS

This application is related to commonly owned and copending U.S. application Ser. No. 07/548,303 filed in the name of the same applicants as the present application on July 5, 1990 and U.S. application Ser. No. 07/564,466 filed in the name of the same applicants as the present application on Aug. 9, 1990, the entire content of each said copending application being incorporated hereinto by reference.

FIELD OF INVENTION

The present invention relates to polybutylene terephthalate resin molded articles having a graphic and/or indicia pattern (including letters, figures, symbols and the like) formed on a surface thereof, and to processes for preparing such molded articles.

BACKGROUND AND SUMMARY OF THE INVENTION

Molded resin articles have been decorated in the past with graphic and/or indicia patterns (such as letters, figures, symbols and the like) using known foil-decorating techniques. According to the foil-decorating technique, a molded surface-patterned article is prepared by placing in a mold cavity a resin film bearing a selected graphic and/or indicia pattern, filling the mold cavity with a molten resin (or a resin prepolymer) and then compressing the thus obtained molded article under heat and pressure to integrate the film onto a surface of the molded article. In the case of thermosetting resins, this heat and pressure treatment serves to cause the resin to react further.

The foil-decorating technique has been used extensively to decorate the surfaces of molded articles formed of thermosetting resins (e.g. melamine resin) with pictorial patterns. However, when thermosetting resins are used to form surface-patterned articles, the steps employed in foil-decorating become relatively complex thereby increasing the costs associated with manufacturing such articles. Accordingly, the use of foil-decorating techniques using thermoplastic resins has recently gained more attention because molded articles of thermoplastic resins are more easily obtained by injection molding techniques, resulting in lower production costs. In this regard, foil-decorated injection-molded articles using polyolefins, such as polypropylene have been commercialized.

The thermoplastic polyolefin resins that have typically been used in foil-decorating techniques generally exhibit poor heat resistance, strength and rigidity. Thus, although these typical resins can be used to form injection-molded articles that may be employed in some end-use applications, they cannot usually be employed in end-use applications where severe conditions may be encountered. In the case of injection-molded tableware, food vessels or trays, for example, a number of additional performance requirements must be met. Specifically, the odor and/or color of food must not migrate into the resin. Conversely the odor and/or "taste" of the resin should not migrate into the food.

Molded articles satisfying all of the foregoing requirements have not been developed to date. It is therefore towards fulfilling such a need that the present invention is directed.

The present invention broadly resides in foil-decorated surface-patterned articles formed of polybutylene terephthalate (PBT) resin. In this regard, PBT resins have not been used previously as a substrate body for foil-decorations.

More specifically, in accordance with the present invention, a process for preparing a surface-decorated polybutylene terephthalate resin molded article (i.e., having a graphic and/or indicia pattern formed on a surface of the article) is especially characterized by placing a film composed mainly of a polybutylene terephthalate resin, and back-printed with the desired pattern, in a cavity of a mold so that the printed surface of the film will be in contact with the subsequently injected resin. The PBT film further includes a coating layer of adhesive applied over the printing on the back side thereof (i.e. so as to come into contact with resin injected into the mold cavity). Molten resin comprised of polybutylene terephthalate is then injected into the mold cavity to fill the same and to integrally bond the pattern-printed film onto the surface of the resulting molded resin article. The resulting equally novel molded article prepared according to this process will thereby have a surface which corresponds to the film, and will exhibit the pattern associated with that film.

BRIEF DESCRIPTION OF THE ACCOMPANYING DRAWINGS

Reference will hereinafter be made to the accompanying drawings wherein like reference numerals throughout the various Figures denote like structural elements, and wherein:

FIG. 2 is a perspective view of a body and lid of a vessel employed in certain of the following Examples.

DETAILED DESCRIPTION OF THE PREFERRED EXEMPLARY EMBODIMENTS

Figure 1A:
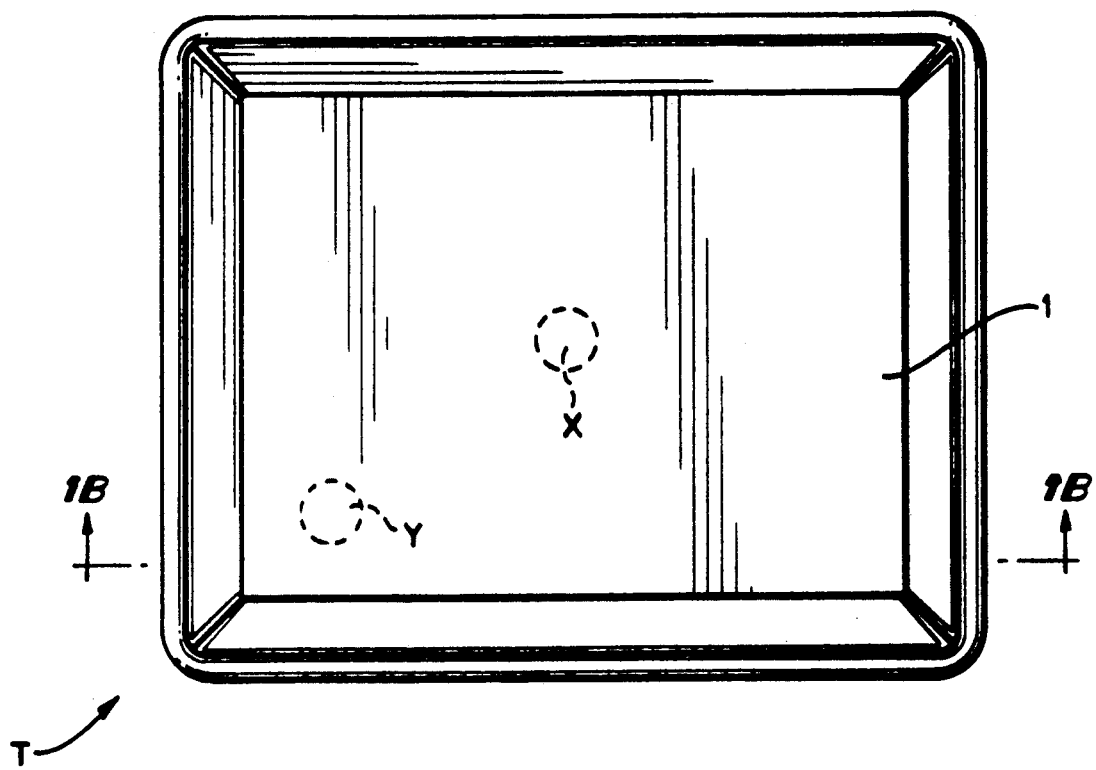
FIG. 1A is a top plan view of a surface-patterned article (tray) employed in the Examples to be discussed below.

According to the present invention, a film consisting essentially of a polybutylene terephthalate resin and having a pictorial pattern formed thereon is first coated with an adhesive layer so as to cover the pictorial pattern. In other words, the adhesive coating layer is applied onto the same side of the film as the printed pattern.

The polybutylene terephthalate resin that may be employed in the present invention is typically obtained by condensing 1,4-butanediol with terephthalic acid or an ester-forming derivative thereof. Other resins which are formed mainly of polybutylene terephthalate units may also be used to form the printed film used in accordance with the present invention. For example, copolymers comprised of butylene terephthalate units as their main structural units, or modified products obtained by grafting or crosslinking can be used as the base resin of the film used in the present invention.

Known additives typically employed in thermoplastic resins, for example, stabilizers such as antioxidants and ultraviolet absorbers, plasticizers, antistatic agents, surface active agents, crystallization promoters, inorganic fillers, and other thermoplastic resins, can be blended with the PBT resin depending upon the properties that are desired. When these additives are used, consideration must be given to the additive types and amounts so that the intended effect of the present invention is not diminished. Incorporation of an additive that either degrades the transparency of the film (i.e., colors) and/or inhibits the film's adhesion to the substrate body of injection-molded resin must especially be avoided.

The film used in the present invention is preferably a so-called "back-printed" transparent film. That is, the film used is one where the desired pattern is reverse-printed on the film's back surface so that the intended pattern is visibly perceptible when the film is observed from the film's front surface (i.e., through the film's thickness).

The adhesive is applied onto the printed surface of the film. Any suitable adhesive (sometimes called an "anchoring agent") typically used for lamination of films and sheets can be employed as the adhesive in accordance with the present invention. Preferably, the adhesive used will be a thermosetting adhesive so that curing and bonding to the underlying PBT substrate body is promoted by the heat of the molten PBT resin during the injection molding step. Exemplary adhesives include polyethyleneimine adhesives, organic titanium compound adhesives, polyolefin adhesives, polybutadiene adhesives, isocyanate adhesives and polyester adhesives may be used. Improved adhesiveness between the film and filled resin, as well as improved heat, moisture and hot water resistances, isocyanate adhesives and polyester adhesives are preferably used in the present invention. Isocyanate adhesives are often called "polyurethane adhesives". That is, the term "isocyanate adhesive" is a generic term that refers to polyisocyanate-based adhesives, such as adhesives which are comprised of polyisocyanate compounds, polyisocyanate/polyhydric alcohol adducts, prepolymers of polyisocyanate compounds and polyhydric alcohols, polyurethanes comprising polyisocyanate compounds and polyester polyols or polyether polyols, and polyhydric alcohols and/or polyisocyanate compounds that are incorporated into the foregoing adhesives. Of the foregoing isocyanate adhesives, adhesives comprising a polyol component selected from polyester polyols and polyester polyurethane polyols and a polyisocyanate component composed of adducts of polyhydric alcohol-polyisocyanate compounds are especially preferable.

Commercially available adhesives are typically classified by those that are self-curing (i.e., so-called "single component" adhesives), and most that require a curing agent/catalyst in addition to a resin component (i.e., so-called "two-component" adhesives). In the present invention, two-component adhesives are especially preferred because the adhesion of the film to the molded article is further improved. The amount of the adhesive depends on the particular type of adhesive used. However, it is usually preferred that the adhesive be applied in an amount between about 0.3 to about 20 grams, especially between 1 to 7 grams, per square meter of the film surface.

The application of the adhesive can be performed at any time after the film has been back printed up to the point of initiation of the molding sequence. However, from an economic viewpoint, it is preferred that the adhesive coating be applied either sequentially after printing, or continuously applied when the film is unrolled. The pictorial pattern-printed and adhesive-coated film can be cut to the appropriate size and then used in the foil decorating process. The coating method used to apply the adhesive is not particularly critical. Thus, any known method such as gravure roll printing, reverse roll printing, boss roll coating, bar coating, and spray coating techniques can be adopted.

The pattern-printed and adhesive-coated film may be placed in the mold cavity using electrostatic charging or vacuum techniques. In the former technique, the film is electrostatically charged opposite to the mold so that strong electrostatic attraction forces will assist in the placement of the film in the mold cavity. In the latter technique, a vacuum is drawn between the film and the mold to cause the film to be drawn into conformance with the mold surface. By these techniques, reliable placement of the film within the mold cavity is assured.

The thickness of the film is not particularly critical. However, if the thickness of the film is too small, there is a risk that the film will break or wrinkle when the molten resin is injected into the mold cavity. On the other hand, if the thickness of the film is too large, the film loses its transparency thereby degrading the sharpness of the back-printed pattern. Accordingly, it is preferred that the thickness of the film be between 20 to 200 $\mu$m, especially between 50 to 100 $\mu$m.

With the film properly placed in the mold cavity (i.e., at a position corresponding to that portion of the resulting injection-molded article's surface intended to bear the pattern film), the molten PBT resin is then injected into the mold cavity so as to fill the same. The patterned film is thus bonded and integrated to the injected resin by the heat energy and pressure of the injection molding process. As noted above, the injection molded resin is composed mainly of polybutylene terephthalate and preferably is similar to the resin that forms the back-printed film.

Materials typically added to ordinary thermoplastic resins can also be incorporated into the PBT resin forming the substrate body. Examples of such additives include those mentioned above with respect to the patterned film, as well as flame retardants, flame retardant assistants, pigments and fibrous, plate-shaped or powdery fillers such as glass fibers, carbon fibers, glass flakes, mica powder, glass beads or talc powder.

Conditions ordinarily adopted for the injection molding of polybutylene terephthalate resins, such as the temperatures of the mold and resin, the injection pressure, and/or the injection speed can be adopted as the conditions used for injection-molding the molten PBT resin into the film-lined mold cavity according to the present invention. If the injection speed is too low, the resin's moldability is drastically degraded. In view of the balance between the adhesion and moldability, it is thus preferred that the injection speed be between 0.5 to 3.0 m/min, especially between 1.0 to 2.0 m/min.

It has also been found that the size and position of the gate influences the finished state (e.g. film tearing and/or wrinkling) of the surface-patterned molded article having a pictorial pattern formed thereon. From this viewpoint, it is preferred that a single-point gate be used and that the gate be disposed on a side of the mold opposite to the film and in confronting relationship generally at the film's center.

The size of the gate depends on the size of the molded article and the size of the film that forms the pattern. In this regard, it is preferred that the cross-sectional area of the gate be between 1.5 to 300 mm$^2$, especially between 7 to 200 mm$^2$. The geometric shape of the gate is not particularly critical. Thus, circular, ellipsoidal, square and rectangular gate shapes can be appropriately adopted according to the shape of the molded article and/or the shape of the pattern-printed film. If the pattern-printed film is relatively long and narrow, a special gate such as a film gate can be adopted. Furthermore, in the case where a number of films are used to impart desired patterns to a single molded article, it is preferred that a respective gate be provided for each printed film used.

The surface-patterned injection-molded polybutylene terephthalate resin article which is prepared according to the above-mentioned process exhibits good adhesion between the film and the PBT resin substrate body as well as a good surface appearance.

Moreover, the surface-printed injection-molded article of polybutylene terephthalate of the invention exhibits excellent resistance to heat and hot water, as well as improved strength and rigidity properties not possessed by conventional foil-decorated molded articles. Accordingly, new end uses of foil-decorated molded articles can be developed due to the present invention. The molded articles of the present invention are further characterized in that no odor migration between the food and the molded article occurs. Therefore, the molded articles of the present invention may be suitably used as tableware, food vessels, or food trays.

EXAMPLES

The present invention will now be described in detail with reference to the following non-limiting Examples.

In the following Examples, film adhesion was evaluated by the following square-cut peeling test (according to JIS K-5400). In this regard, square cuts were formed at intervals of 2 mm between a region close to the gate (i.e., region X in FIG. 1A) and a region distant from the gate (i.e., region Y in FIG. 1A). A tape was then applied to the film and peeled away. Film adhesion was evaluated based on the number of film squares that were removed, with the result being expressed by the number of removed squares per 100 squares).

Detergent resistance was evaluated by repeatedly washing (10 times) the samples in 60° C. water with an alkaline detergent for 20 minutes and then dried in hot air. The detergent resistance was then evaluated using the peel test described above using region X.

EXAMPLE 1 THROUGH 5 AND COMPARATIVE EXAMPLE 1

Figure 1B:
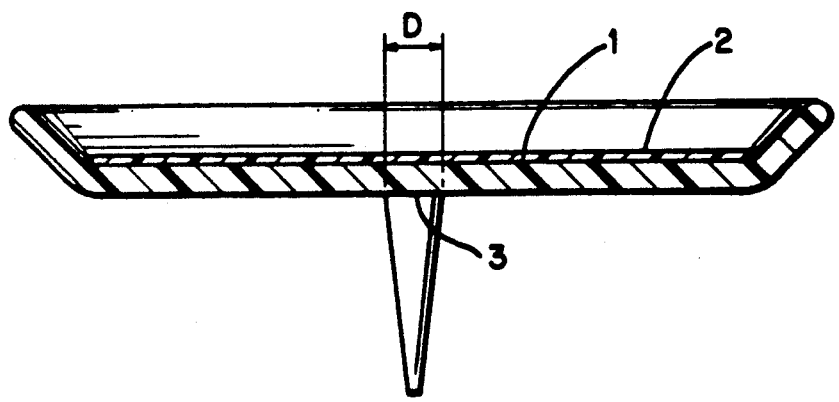
FIG. 1B is a cross-sectional side elevation view of the surface-patterned vessel (tray) shown in FIG. 1A as taken along line B—B therein.

Molded articles in the form of a tray T (250 mm ×200 mm ×3 mm) having a pictorial pattern film 1 integrally bonded to an inner surface of the tray's flat portion 2 as shown in FIGS. 1A and 1B were prepared under various molding conditions specified in Table 1. In this regard, the adhesives listed in Table 1 were each applied (3 g of adhesive per m$^2$ of the film) onto a respective surface of a polybutylene terephthalate resin film 1 (having a thickness of 70 μm and a melting point of 228° C.) which was back-printed with a pictorial pattern. The thus adhesive-coated film was then placed within a mold cavity so that the adhesive-coated surface was exposed (i.e., so that the adhesive contacts the resin to be injected later into the mold cavity). Molten polybutylene terephthalate resin was then injected into the mold cavity so as to fill the same and to obtain the molded tray T. The temperatures of the molten resin and the mold were 260° C. and was 60° C. respectively, and the injection molding pressure was 500 kg/cm$^2$. The gate size and injection speed during molding were varied as shown in Table 1. Neither warping nor deformation was found in any of the molded articles, and each molded article had a good appearance. The evaluation results are shown in Table 1. For comparison, a molded article was similarly prepared without applying an adhesive onto the back-peeled surface of film 1. The evaluation results of such comparison are also shown in Table 1.

TABLE 1

| | | | Ex. 1 | Ex. 2 | Ex. 3 | Ex. 4 | Ex. 5 | Comp. Ex. 1 |
|---|---|---|---|---|---|---|---|---|
| Adhesive | | | isocyanate type[4] (two-pack) | isocyanate type[4] (two-pack) | isocyanate type[4] (two-pack) | isocyanate type[4] (one pack) | polyester type (two-pack) | — |
| Gate size (mm$^2$)[1] | | | 28 | 28 | 13 | 28 | 28 | 28 |
| Injection speed (m/min) | | | 1.5 | 2.5 | 1.5 | 1.5 | 1.5 | 1.5 |
| Evaluation results | peel test of square cuts | point X | 0/100 | 0/100 | 0/100 | 0/100 | 0/100 | 0/100 |
| | | point Y | 0/100 | 0/100 | 0/100 | 0/100 | 0/100 | 0/100 |
| | appearance after hot water treatment[2] | | 10 | 10 | 10 | 10 | 10 | 9 |
| | peel test after hot water treatment[3] | point X | 0/100 | 0/100 | 0/100 | 2/100 | 0/100 | 26/100 |
| | | point Y | 0/100 | 0/100 | 0/100 | 3/100 | 0/100 | 32/100 |
| | detergent resistance at point X | | 0/100 | 0/100 | 0/100 | 5/100 | 2/100 | 47/100 |

Notes For Table 1:
[1]The size at the intersection of the tray (i.e., the location identified by reference numeral 3 in Figure 1B). In each Example, a single-point gate having a circular cross-sectional shape and diameter D was disposed at a point confronting the center of the film.
[2]Sharpness of the pictorial pattern, peeling or wrinkling of the film were checked after heating in hot water at 95° C. for 1 hour. The appearances were qualitatively evaluated by a 10-point method where 10 was the best and 1 was the worst.
[3]The adhesion of the film after the hot water treatment described in Note 2.
[4]An adhesive comprising a main component containing polyester polyol and a curing agent containing trimethylolpropane/tolylene diisocyanate adduct.
[5]An adhesive containing a prepolymer formed by chain-extending polyester polyol with tolylene diisocyanate.

EXAMPLE 6

In order to examine odor migration that may occur in the case of tableware, food vessels or the like, vessels V having a body B and a lid L as shown in FIG. 2 were molded using a polybutylene terephthalate resin. A pictorial pattern was formed on the top surface of the lid L. Water, oil or curry was placed in the body B of the vessel V, and the lid L was then positioned onto the body B so as to close the same. The closed vessel V was then heated at 90° C. Migration of odor to the contents from the vessel V was not observed, and thus it was confirmed that the vessel V resisted odor migration. In addition, adhesion of the pictorial pattern film bonded to the top surface of the lid L was not detrimentally affected — that is, the peel test of cut squares resulted in 0/100.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A surface-patterned injection-molded polybutylene terephthalate resin article comprised of a substrate body which consists essentially of polybutylene terephthalate resin, and a transparent thermoplastic film having a predetermined thickness and a selected pattern printed upon a surface thereof, and an adhesive layer interposed between the substrate body and the film for integrally bonding the film to a surface region of said substrate body such that said printed surface of said film is positioned adjacent said predetermined substrate body surface with the adhesive layer therebetween, whereby said printed pattern is visible through the thickness of the film.

2. A surface-patterned injection-molded article as in claim 1, wherein said adhesive layer is selected from isocyanate or polyester adhesives.

3. A surface-patterned injection-molded article as in claim 2, wherein said film consists essentially of a polybutylene terephthalate resin.

4. A surface-patterned injection-molded article as in claim 1, in the form of tableware, a food vessel, or a food tray.

5. A process for preparing an injection-molded surface-patterned polybutylene terephthalate article comprising:

placing a film consisting essentially of polybutylene terephthalate and back-printed with a desired pattern into a mold such that the unprinted side of the film is in contact with the mold surface and the back-printed side of the film is exposed to the mold cavity, and then injecting molten polybutylene terephthalate resin into the mold cavity so as to contact the back-printed side of the film, and allowing the film to integrally bond to the injection-molded polybutylene terephthalate resin, wherein prior to placing the film into the mold, the back-printed surface of the film is coated with an adhesive.

6. A process as in claim 5, wherein the adhesive is one selected from isocyanate adhesives or polyester adhesives.

7. A process as in claim 6, wherein the adhesive is a two-component adhesive that includes a resin component and a curing agent for said resin component.

8. A process as in claim 5, wherein said step of injecting the polybutylene terephthalate resin includes using a single point gate having a cross-sectional area of between 1.5 to 300 $mm^2$.

9. A process as in claim 8, wherein said step of injecting the polybutylene terephthalate resin includes positioning the gate so as to be in opposing relationship to a central portion of the film in the mold cavity.

10. A process as in claim 5 or 9, wherein wherein the thickness of the back-printed film is between 30 to 150 $\mu$m.

11. A process as in claim 5, wherein the step of injection-molding is carried out at a molten polybutylene terephthalate injecting speed of between 0.5 to 3.0 m/min.

12. A process for producing an injection-molded polybutylene terephthalate article having a pattern on at least a selected surface portion thereof, said process comprising:

applying a coating layer of adhesive onto a rear surface of a rear surface-printed thermoplastic film such that the adhesive layer covers the printing on the rear surface thereof;

lining a region of a mold cavity corresponding to said selected surface portion of the article with the rear surface-printed thermoplastic film by placing the front surface of the film against the mold so that the rear surface of the film is exposed to the mold cavity; and then injecting a polybutylene terephthalate resin into the film-lined mold cavity so as to form said article with a pattern on said selected surface portion thereof.

13. A process as in claim 12, wherein said thermoplastic film consists essentially of polybutylene terephthalate resin.

14. A process as in claim 13, wherein said film is transparent.

* * * * *

UNITED STATES PATENT AND TRADEMARK OFFICE
CERTIFICATE OF CORRECTION

PATENT NO. : 5,100,717
DATED : March 31, 1992
INVENTOR(S) : Shigeru NEDZU, et al It is certified that error appears in the above-identified patent and that said Letters Patent is hereby corrected as shown below:

Column 5, line 63, delete ")".

Column 6, line 2, change "EXAMPLE" to read --EXAMPLES--.

Column 6, line 21, delete "was".

IN THE CLAIMS:

Column 8, Claim 10, line 1, delete "wherein" (second occurrence).

Signed and Sealed this

Twentieth Day of July, 1993

Attest:

MICHAEL K. KIRK

Attesting Officer          Acting Commissioner of Patents and Trademarks